United States Patent [19]
Seip

[11] 3,841,713
[45] Oct. 15, 1974

[54] LOAD-DEPENDENT BRAKE FORCE DISTRIBUTOR
[75] Inventor: Hermann Seip, Bad Vibel, Germany
[73] Assignee: ITT Industries, New York, N.Y.
[22] Filed: Oct. 26, 1972
[21] Appl. No.: 301,040

[30] Foreign Application Priority Data
Nov. 9, 1971 Germany.............................. 2155706

[52] U.S. Cl.............................. 303/22 R, 188/195
[51] Int. Cl............................................... B60t 8/22
[58] Field of Search.... 303/22 R, 22 A, 23 R, 84 A, 303/21 AF; 188/195; 251/31

[56] References Cited
UNITED STATES PATENTS

| | | | |
|---|---|---|---|
| 2,363,235 | 11/1944 | Ellinwood | 251/31 |
| 2,729,515 | 1/1956 | Ross et al. | 303/22 R |
| 2,814,532 | 11/1957 | Stephanski | 303/84 A |
| 3,149,886 | 9/1964 | Dorner | 303/22 A |
| 3,393,512 | 7/1968 | Puma | 303/84 A |
| 3,442,557 | 5/1969 | Oberthur | 188/19 S |
| 3,475,059 | 10/1969 | Klein | 188/195 |
| 3,556,609 | 1/1971 | MacDuff | 303/22 R |
| 3,747,990 | 7/1973 | Tanguy | 303/21 AF |
| 3,762,776 | 10/1973 | Kawabe et al. | 303/22 R |

Primary Examiner—Trygve M. Blix
Assistant Examiner—Galen L. Barefoot
Attorney, Agent, or Firm—John T. O'Halloran; Menotti J. Lombardi, Jr.; Alfred C. Hill

[57] ABSTRACT

The distributor disposed between the master cylinder and the wheel brakes includes a stepped piston displaceably disposed in a cylinder and a valve in the stepped piston which closes and opens dependent upon an axle load control force. In the open position of the valve two chambers, one for brake pressure input and the other for brake pressure output, formed at two different sides of the stepped piston between the stepped piston and the cylinder are interconnected. When the control force acting on the stepped piston fails, the valve in the past has resulted in a reduction of the brake force to the wheel brakes regardless of the axle load. According to the present invention a second valve is provided or the valve of the stepped piston is acted upon such that in the event of failure of the control force a direct hydraulic communication is established between the brake pressure input and output chambers.

4 Claims, 5 Drawing Figures

LOAD-DEPENDENT BRAKE FORCE DISTRIBUTOR

BACKGROUND OF THE INVENTION

The invention relates to a load-dependent brake force distributor connected between the master cylinder and the wheel brake cylinder and having a stepped piston which is displaceably disposed in a cylinder, said piston containing a valve which closes and opens in dependence on the axle load and which in its opened position connects the two cylinder chambers formed by the stepped piston.

Such brake force distributors are mainly used in motor cars and trucks in order to ensure that full brake pressure is available if the axle is loaded to its maximum and in order to correspondingly reduce the brake pressure supplied by the master cylinder if the vehicle is not loaded and to thus prevent a locking of the vehicle's wheels. Usually such brake force distributors are mechanically controlled. If due to certain circumstances, such as wear, rupture caused by violence or rupture caused by permanent stress, a failure in the control linkage occurs the stepped piston moves to adopt a position where only the reduced brake pressure will be available for the wheel cylinders. This involves the particular disadvantage that an uncontrolled axle (preferably the front axle) which is generally also provided is underbraked, that is, the pedal force does not suffice to achieve the maximum braking of the vehicle. The brake force distributors are mainly used for the vehicle's rear wheels.

SUMMARY OF THE INVENTION

It is an object of the present invention to provide a brake force distributor of the type referred to above where in the event of failure of the control force there is ensured that full brake pressure is applied to the wheel brake cylinders.

A feature of the present invention is the provision of a load-dependent brake force distributor connected between a master cylinder and wheel brake cylinders comprising: a cylinder; a stepped piston disposed in a longitudinal slidable sealed relation in the cylinder; an input pressure medium chamber formed between one end of the cylinder and one side of the stepped piston; an output pressure medium chamber formed between the other end of the cylinder and one other side of the stepped piston; a first valve disposed concentrically of the stepped piston to connect the input chamber to the output chamber in its open position; a first arrangement connected to the stepped piston responsive to a load-dependent control force to open and close the first valve; and a second arrangement associated with one of the cylinder, the piston and the first valve to provide a direct connection between the input chamber and the output chamber when the control force fails.

For solving this task the present invention provides that in the event of a failure of the control force depending on the axle load and effective at the stepped piston the piston is governed by a return force acting against the control force and that a valve is provided which in such an event will establish a direct hydraulic communication between input and output. Thus, the delivered pressure will be equal to the feed-in pressure. Admittedly, now there exists the danger of overbraking the rear axle if the vehicle is unloaded. However, in full-load condition of the vehicle the pedal forces cannot become excessive.

The stepped piston preferably has a piston section having a relatively large diameter slidable within the cylinder and a piston section having a relatively smaller diameter slidable within a cylindrical projection connected to one end of the cylinder. The control force can expediently act on the piston section of smaller diameter via a spring, a bar and a push rod. The valve is preferably provided with a pin projecting from the bottom of the thicker piston section which abut the cylinder bottom or transverse closing wall to open the valve against the force of a valve spring when the piston is displaced by a predetermined control force. The valve and the valve spring are advantageously housed in a cavity of the thicker piston section which is provided with communicating bores to the two cylinder chambers.

According to a first preferred embodiment the valve becoming active in the event of the failure of the control force is a separately provided valve which is normally closed and which is opened by the return movement of the piston.

An especially practical embodiment is characterized by the fact that the separate valve is disposed in the cylinder wall and has a tappet projecting into a cylinder chamber and there cooperating with a bevel on the thicker piston section in such a manner that the valve will open when upon a failure of the control force the piston moves back and the bevel comes into contact with the tappet. In doing so, the valve expediently communicates with the output chamber via a duct.

A further embodiment disposes the separate valve in the stepped piston and is provided with a tappet projecting from the annular surface and coming into abutment with the rear wall of the cylinder or an abutment of the cylindrical projection upon a failure of the control force and, hence, opens a communicating duct between the cylinder chambers which passes through the thicker piston section. This embodiment is advantageous in that only the stepped piston — and not the cylinder — is modified.

An especially simple, yet effective embodiment which utilizes the normally provided valve, which in normal operation is active to accomplish the results of the present invention upon the failure of the control force. Thus, in this case the normally provided valve will be utilized in a twofold way.

A practical embodiment provides that the normally provided valve is connected with a traction rod on the side thereof opposite the normal operating pin. Said traction rod pulls the normally provided valve into the open position upon the failure of the control force and is freely displaceable in the normally provided valve by an amount that will ensure the free and unhindered normal operation of this valve. Thus, the traction rod becomes effective only in the event of failure of the control force.

A further embodiment is such that the traction rod projects through the smaller piston section in a freely displaceable manner until it reaches a spherical cup element which is acted upon by the control force. The cup element is prestressed by a pressure spring to move away from the piston. In doing so, the pressure spring is rated stronger than the valve spring in order to enable the pressure spring to open the normally provided valve upon failure of the control force.

According to a further preferred embodiment the stepped piston is prestressed by a return spring which has the effect that upon a failre of the control force the stepped piston will move against the control force up to an abutment on rear cylinder wall or cylindrical projection. Said pressure spring is particularly expedient if the normal valve has already closed before the piston has opened the additional valve.

According to a further embodiment the return spring is housed in an annular recess of the thicker piston section.

For realizing the embodiments of the present invention it is expedient to limit the return movement of the stepped piston by providing an appropriate abutment so that a sufficient hydraulic connection behind the piston is maintained between the input and the valve or valves in order to enable an unhindered passage of the circulated brake pressure medium from the input to the output and, hence, to the brake cylinders.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
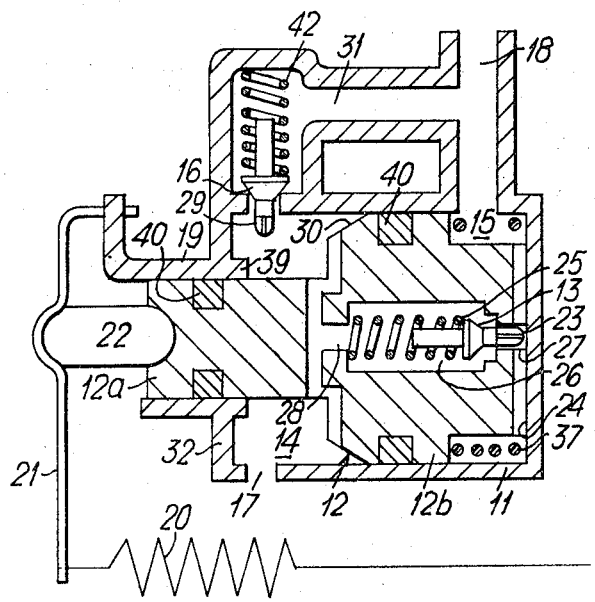
FIG. 1 shows a schematic longitudinal cross section of a first embodiment of a brake force distributor in accordance with the present invention in the normal operating position under relatively high-load condition of the axle.

According to FIG. 1 a stepped piston 12 is disposed in a cylinder 11 with stepped piston 12 including a larger diameter piston section 12b and a smaller diameter piston section 12a. Piston section 12a is sealed to and slidable in a cylinder projection 19.

A valve 13 is housed within a cavity 26 provided in the interior of piston section 12b coaxial of the longitudinal axis thereof. Valve 13 is prestressed by a helical pressure spring 25 towards the right-hand side (see FIGS. 1 and 2). According to FIG. 1 valve 13 is provided with a pin 23 at its right-hand side which projects outwards through a communicating aperture 27 and which will come into abutment with transverse closing wall or cylinder bottom 24 when a predetermined amount of control force is present.

Piston section 12b separates two cylinder chambers 14 and 15, chamber 14 communicating with the input 17 leading to the master cylinder and cylinder chamber 15 communicating with the output 18 leading to the wheel brake cylinders.

Piston section 12a has applied thereto the axle load dependent control force via a push rod 22, a bar 21 and a traction spring 20 which in the normal position shown in FIG. 1 has the effect that stepped piston 12 will be in its most right-hand position and that valve 13 will be opened by pin 23 abutting cylinder bottom 24.

Cavity 26 of piston section 12b is hydraulically communicating with cylinder chamber 14 via communicating aperture 28 so that a hydraulic connection between cylinder chambers 14 and 15 is effective via apertures 27 and 28 and cavity 26 when valve 13 is opened.

According to the invention in the cylinder wall a second valve 16 is disposed which has a tappet 29 projecting into cylinder chamber 14, said tappet further cooperating with bevel 30 at the rear end of piston section 12b in such a manner that valve 16 is opened against the force of a pressure spring 42 and thereby provides a connection between cylinder chamber 14 and output 18 via a duct 31. An abutment 39 at the rear wall 32 of the cylinder or extending longitudinally from projection 19 limits the return movement of piston 12 so that a predetermined hydraulic communication is maintained between input 17 and valve 16 as well as valve 13.

Figure 2:
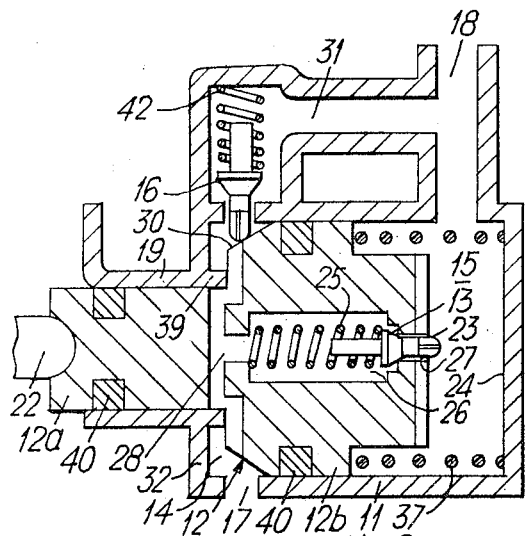
FIG. 2 shows the same section as in FIG. 1, but in an operating position that will occur upon a failure of the control force.

The operation of the embodiment of FIGS. 1 and 2 is as follows:

When the control force is strong due to high axle load, stepped piston 12 is moved towards the right until valve 13 opens and the full pressure will reach the wheel brake cylinders via the communication 28, 26, 27 and 18.

When the control force decreases due to reduced axle load, stepped piston 12 moves towards the left and valve 13 is closed when pin 23 lifts off from bottom 24.

The pressure active at output 18 now is only the reduced pressure corresponding to the surface ratio of stepped piston 12.

In the event of reduced axle load piston 12 will move only that far to the left that valve 13 will be closed, valve 16 not yet being opened. Upon a complete failure of the control force, for example, upon a rupture of spring 20, stepped piston 12 moves further to the left until bevel 30 will slide onto tappet 29, and, thus, will open valve 16. Now a direct connection from input 17 to output 18 via valve 16 and duct 31 is formed which ensures the full application of brake pressure to the wheel brake cylinders. This state is shown in FIG. 2.

Figure 3:
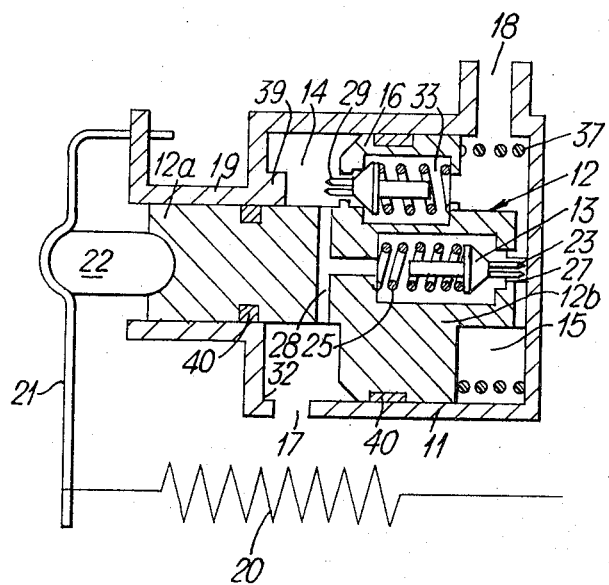
FIG. 3 shows a schematic longitudinal cross section of a second embodiment of a brake force distributor in accordance with the present invention in the normal operating position under full-load condition of the axle.

In the embodiment of FIG. 3 the parts which are the same as in FIG. 1 are identified by the same reference characters as in FIG. 1. The difference between the embodiment of FIG. 3 and the embodiment of FIG. 1 consists in arranging valve 16 within piston section 12b. Tappet 29 projects from the left-hand annular surface of piston section 12b and comes into abutment with rear wall 32 of cylinder 11, or a longitudinally projecting abutment from projection, such as projection 39, when, upon failure of the control force, stepped piston 12 is moved towards the left under the action of the return spring 37 which is also provided in the embodiment of FIGS. 1 and 2.

As soon as tappet 29 abuts rear wall 32 valve 16 opens and a communicating duct 33 between cylinder chambers 14 and 15 is opened.

The operation of the embodiment of FIG. 3 is analogous to that of FIGS. 1 and 2.

Figure 4:
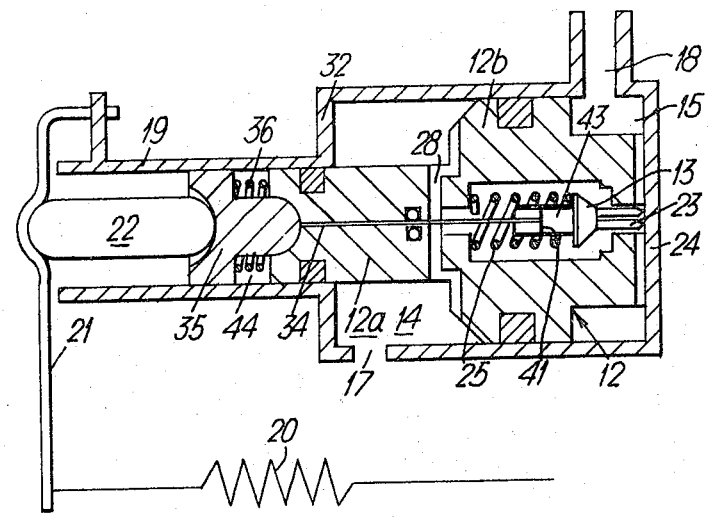
FIG. 4 shows a schematic longitudinal cross section of a third embodiment of a brake force distributor in accordance with the present invention in the normal operating position under relatively full-load condition of the axle.
Figure 5:
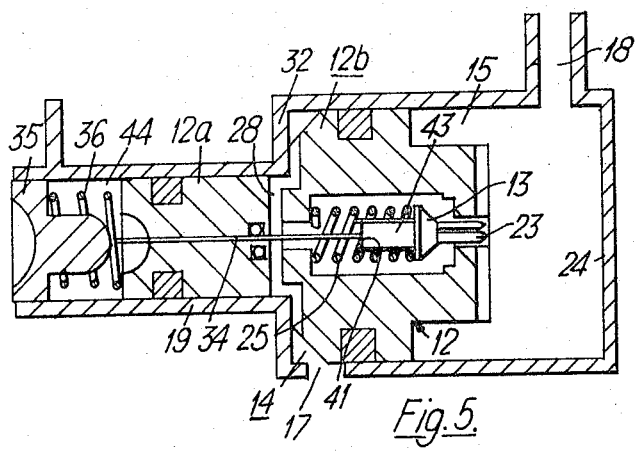
FIG. 5 shows the same section as in FIG. 4, but in an operating position that will occur upon the failure of the control force.

In the embodiment of FIGS. 4 and 5 the arrangement of a second valve is dispensed with. Instead, a traction rod 34 engages a cavity 43 of valve 13, said traction rod 34 having an extension 41 and extends in a freely movable manner through the entire stepped piston section 12a towards the left until it reaches a spherical cup element 35 to which it is fixed. Spherical cup element 35 is prestressed by a pressure spring 36 in the direction away from piston 12. The spherical-cup-shaped projection of element 35 fits into a correspondingly shaped spherical recess in piston section 12a. For housing pressure spring 36 an annular chamber 44 is formed in projection 19 which is dimensioned such that spring 36 is not totally compressed when spherical cup element 35 comes into contact with piston section 12a.

It is of essential importance that pressure spring 36 is designed to be stronger than valve spring 25.

In normal operation as illustrated in FIG. 4, the control force transmitted via push rod 22 firmly presses spherical cup element 35 into the spherical recess of piston section 12a so that the action of spring 36 is virtually undone.

In doing so, abutment 41 at the end of traction rod 34 will move far enough into cavity 43 so that valve 13 can maintain a normal operation, i.e., that it can open under full-load condition of the axle and can close when there is a low axle load.

Upon a failure of the control force as illustrated in FIG. 5, spherical cup element 35 will move towards the left under the action of spring 36 and will thus move away from stepped piston section 12a. In doing so, abutment 41 will come into contact with the end of cavity 43 and carry valve 13 along in the opening direction, since valve spring 25 is weaker than spring 36. Now a hydraulic communication from cylinder chamber 14 to the cylinder chamber 15 is opened via valve 13.

According to FIGS. 1 through 3 return spring 37 is housed in an annular recess at the right-hand end of piston section 12b. The sealing of two piston sections 12a and 12b to projection 19 and housing 11 is ensured by seals 40.

While I have described above the principles of my invention in connection with specific apparatus it is to be clearly understood that this description is made only by way of example and not as a limitation to the scope of my invention as set forth in the objects thereof and in the accompanying claims.

I claim:

1. A load-dependent brake force distributor connected between a master cylinder and wheel brake cylinders comprising:

a cylinder;

a stepped piston disposed in a longitudinal slidable sealed relation in said cylinder;

an input prssure medium chamber formed between one end of said cylinder and one side of said stepped piston;

an output pressure medium chamber formed between the other end of said cylinder and the other side of said stepped piston;

a first valve disposed concentrically of said stepped piston to connect said input chamber to said output chamber in its open position;

a first arrangement connected to said stepped piston responsive to a load-dependent control force to open and close said first valve; and a second arrangement associated with and actuated by said piston to provide a direct connection between said input chamber and said output chamber when said control force fails;

said cylinder having a first diameter and including
  a cylindrical projection extending therefrom having a second diameter less than said first diameter;

said stepped piston including
  a first portion spaced from said cylindrical projection having a third diameter less than said first diameter,
  a second portion adjacent said cylindrical projection having a fourth diameter equal to said first diameter, and
  a third portion having a fifth diameter equal to said second diameter slidably sealed to the inner surface of said cylindrical projection;

said first arrangement including
  a traction spring exerting a force dependent upon said load,
  a bar connected at one end to said cylindrical projection and at the other end to said traction spring, and
  a push rod connected between said bar and said third portion of said stepped piston;

said cylinder including
  a transverse closing wall spaced from the adjacent end of said first portion of said stepped piston;

said first and second portions of said stepped piston including
  a cavity disposed concentrically of the longitudinal axis of said stepped piston,
  an aperture at each end of said cavity, one of said apertures communicating with said input chamber and the other of said apertures communicating with said output chamber,
  said first valve being disposed within said cavity, and
  a valve spring disposed about said valve within said cavity to assist in the control of said first valve;

said first valve including
  a pin projecting from one end thereof through said other of said apertures, said pin abutting said closing wall and opening said first valve against the force of said valve spring when a predetermined amount of said control force is applied to said third portion of said stepped piston;

said second arrangement including
  a normally closed second valve which is open when said control force fails by the movement of said stepped piston away from said closing wall to cause said stepped piston to engage and open said second valve;

said second portion of said stepped piston including a bevelled surface disposed in said input chamber; and said second valve is disposed in a perpendicular relation to the longitudinal axis of said stepped piston and extending through a wall of said cylinder in said input chamber;

said second valve including a tappet extending therefrom to engage said bevelled surface to open said second valve upon failure of said control force.

2. A distributor according to claim 1, wherein said second valve communicates with said output chamber by means of a duct in said cylinder.

3. A distributor acording to claim 1, further including a return spring disposed between the transverse wall of said second portion of said stepped piston and said closing wall to prestress said stepped piston.

4. A distributor according to claim 1, further including an abutment extending from said cylindrical projection into said input chamber to limit the movement of said stepped piston away from said closing wall to ensure sufficient hydraulic communication in said input chamber.

* * * * *